(No Model.) 6 Sheets—Sheet 2.

W. P. CANNING.
MACHINE TO BE DRIVEN BY FLUID PRESSURE.

No. 378,541. Patented Feb. 28, 1888.

WITNESSES
P. N. Kenway
Charles H. Fisher

INVENTOR
Wm P. Canning

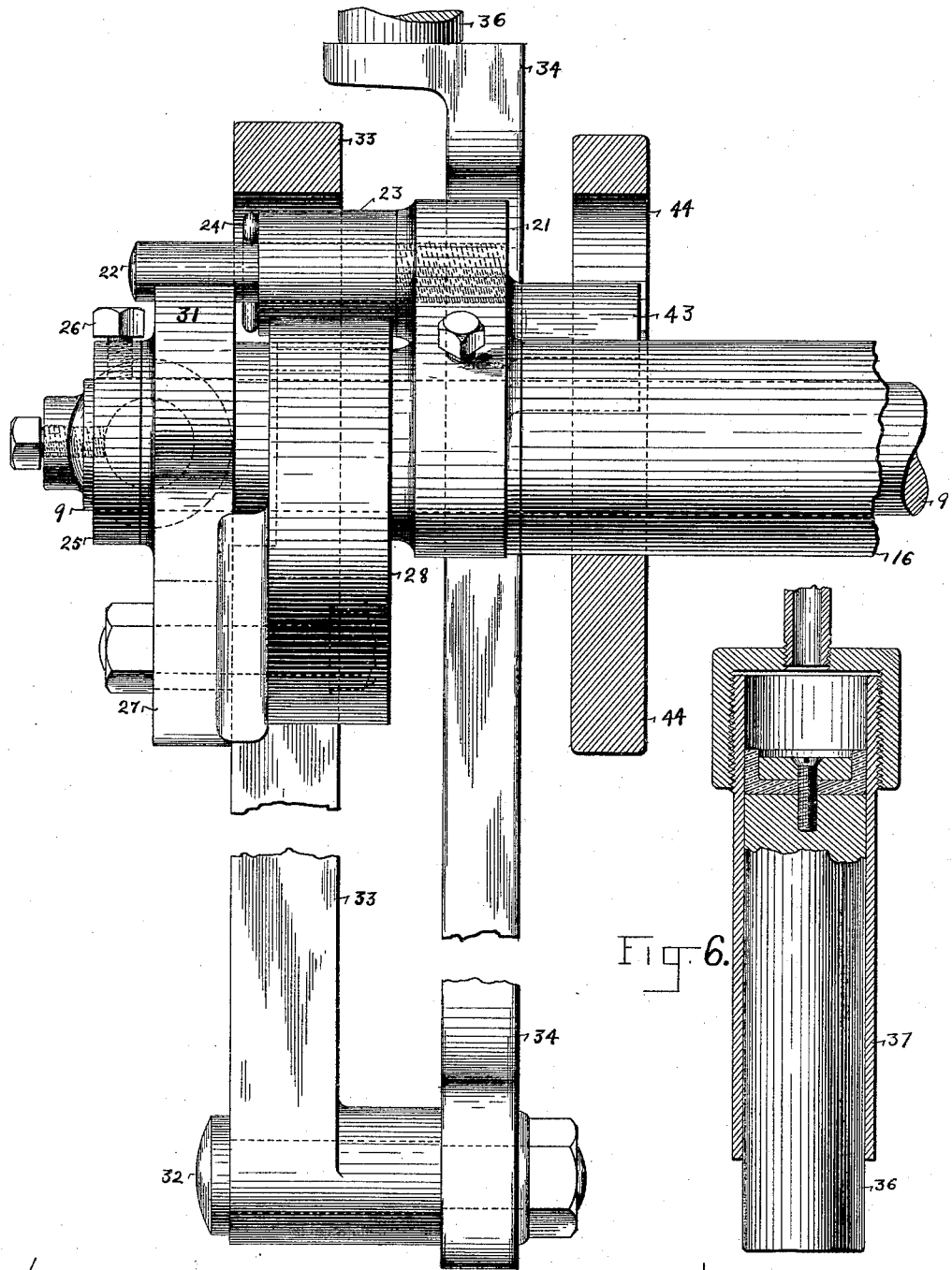

(No Model.) 6 Sheets—Sheet 5.

W. P. CANNING.
MACHINE TO BE DRIVEN BY FLUID PRESSURE.

No. 378,541. Patented Feb. 28, 1888.

WITNESSES:
P. N. Kenway.
Charles H. Fisher.

INVENTOR.
Wm. P. Canning.

(No Model.) 6 Sheets—Sheet 6.
W. P. CANNING.
MACHINE TO BE DRIVEN BY FLUID PRESSURE.
No. 378,541. Patented Feb. 28, 1888.
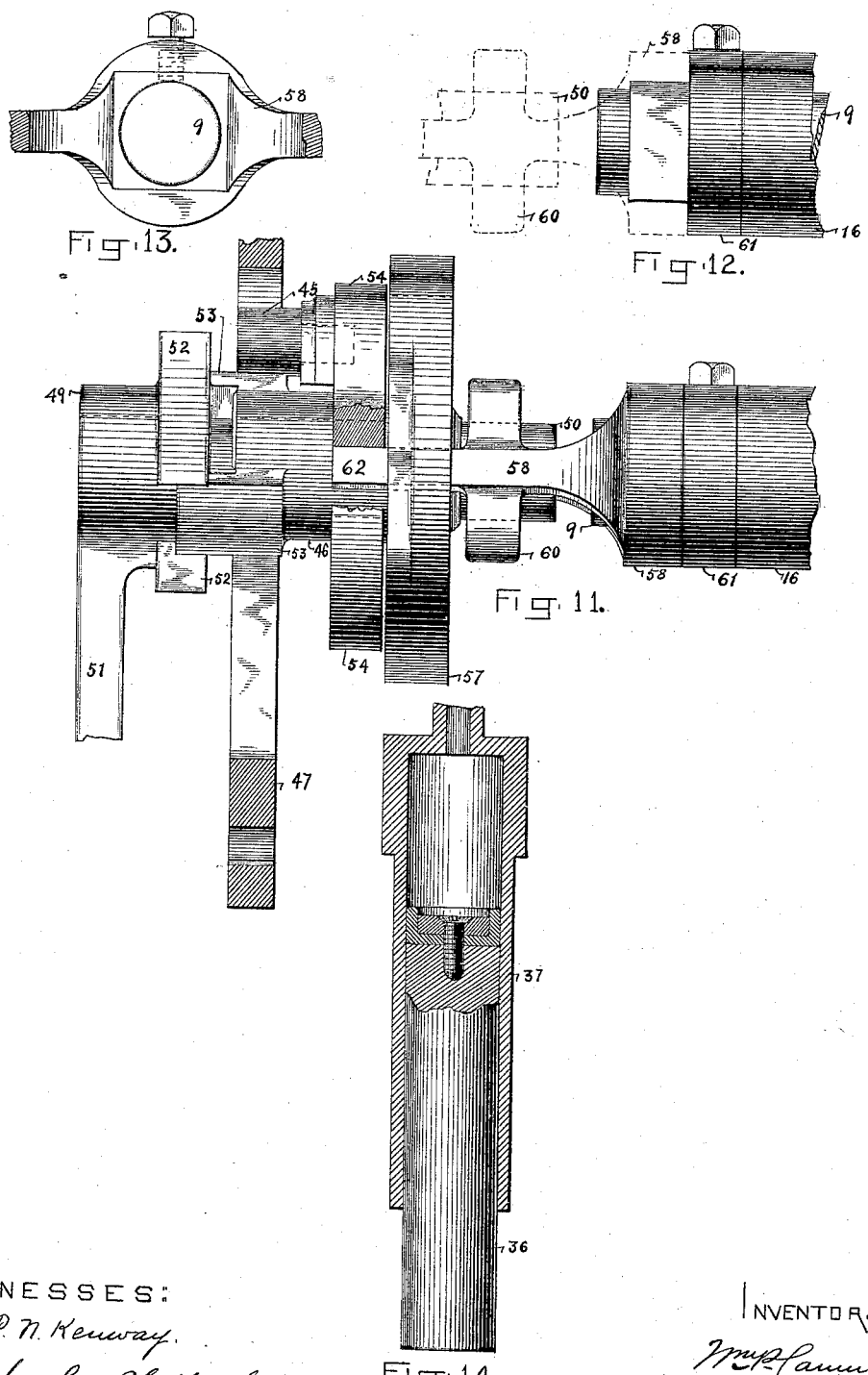
WITNESSES:
P. N. Kenway.
Charles H. Fisher.
INVENTOR
W. P. Canning.

UNITED STATES PATENT OFFICE.

WILLIAM P. CANNING, OF LOWELL, MASSACHUSETTS.

MACHINE TO BE DRIVEN BY FLUID-PRESSURE.

SPECIFICATION forming part of Letters Patent No. 378,541, dated February 28, 1888.

Application filed January 27, 1887. Serial No. 225,621. (No model.)

*To all whom it may concern:*

Be it known that I, WILLIAM P. CANNING, a citizen of the United States, residing at Lowell, in the county of Middlesex and State of Massachusetts, have invented a new and useful Improvement in Fluid-Driven Machines, such as motors, meters, and the like, of which the following is a specification.

My invention relates to that class of machines where a piston is, when the machine is in operation, continually driven by a fluid under pressure from one end to the other of a cylinder and back again, and especially to certain mechanisms and parts thereof, which are hereinafter pointed out.

The object of my invention is to provide means whereby the said piston is controlled in its motion within the said cylinder, as desired, in a novel and superior manner, and in attaining this object I make use of certain mechanism whereby energy which had previously been received from the moving piston is given up to other parts of the mechanism suddenly or gradually, as desired.

My invention is illustrated in the accompanying drawings, in which—

Figure 1:
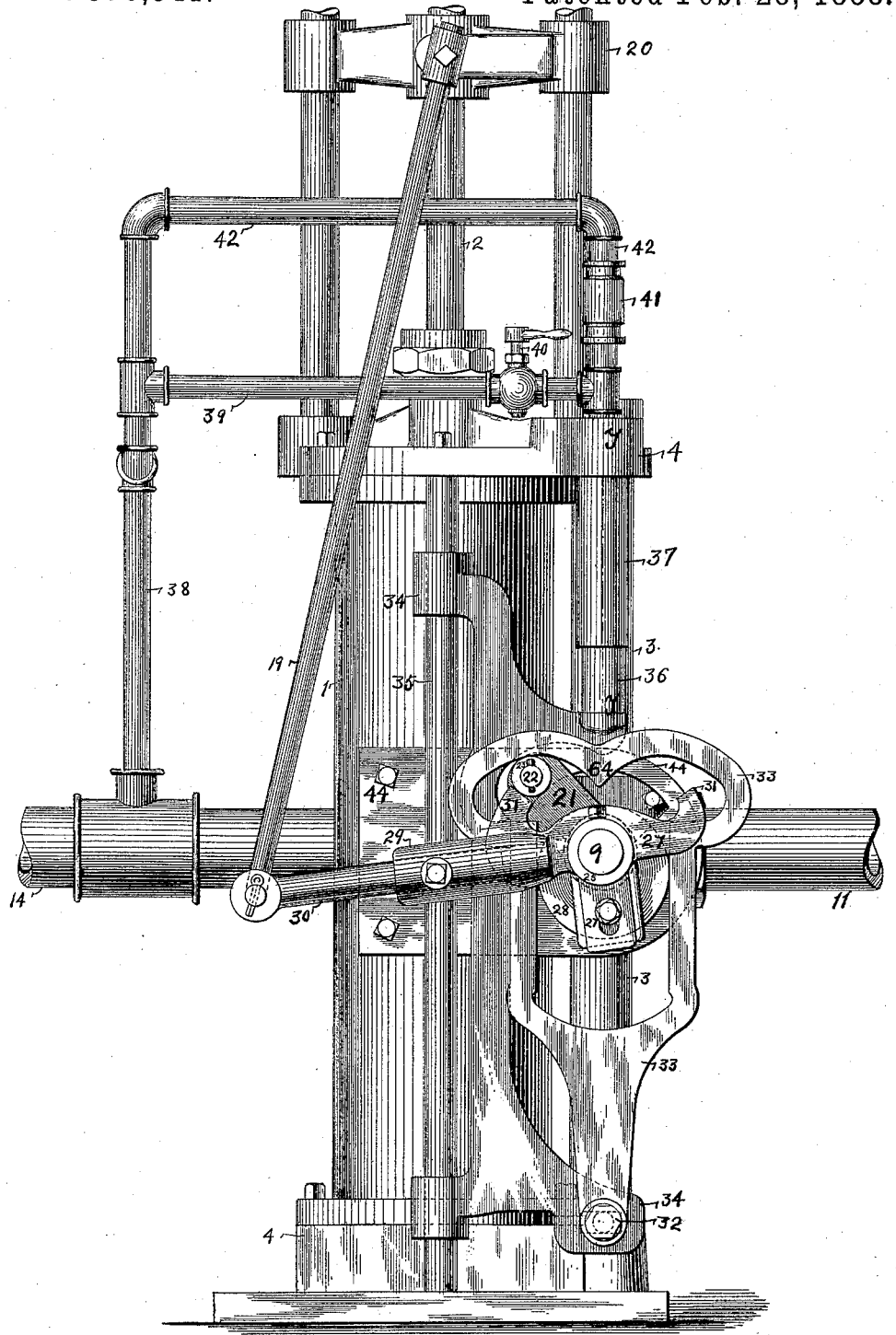
Figure 2:
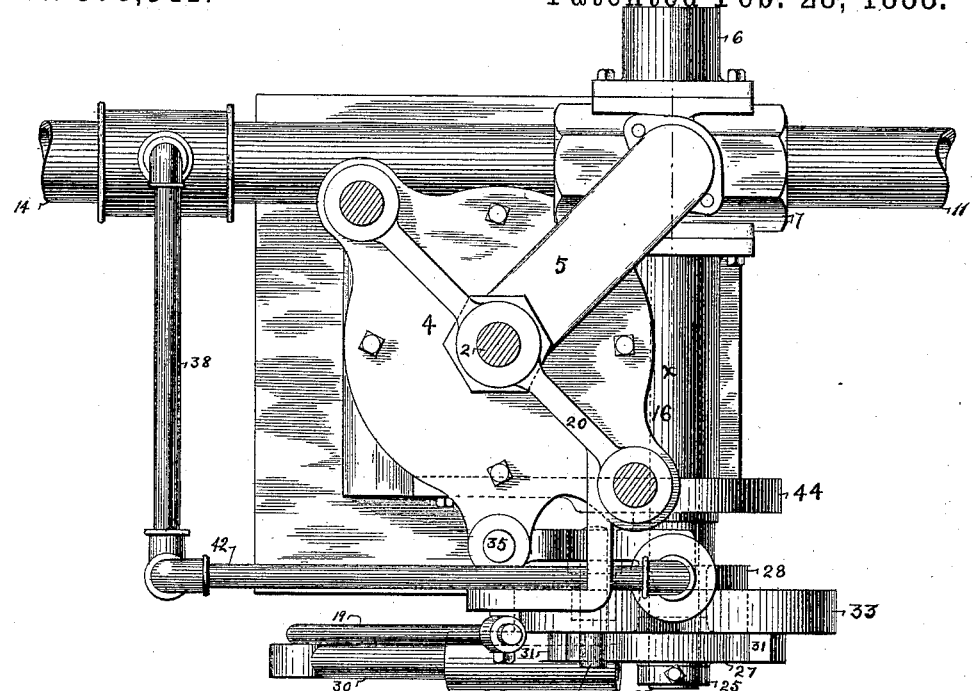
Figure 3:
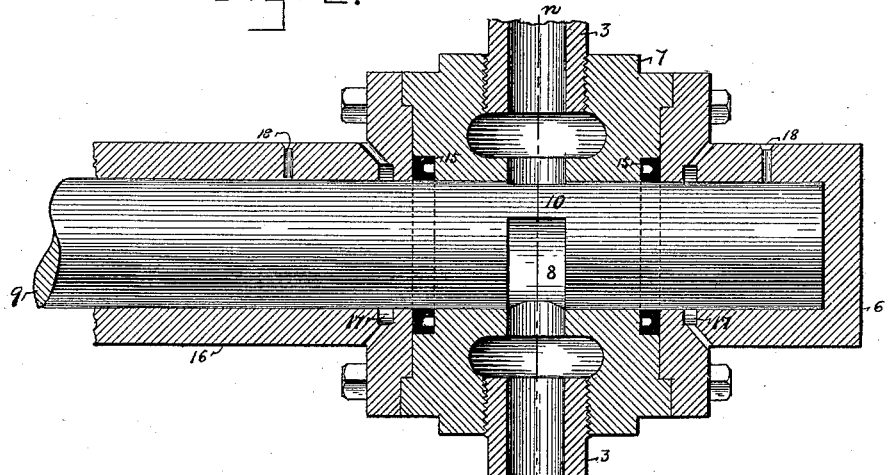
Figure 4:
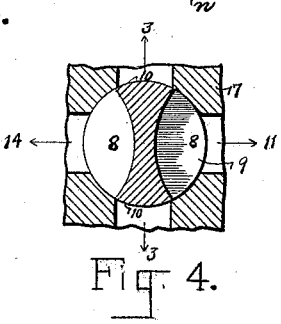
Figure 7:
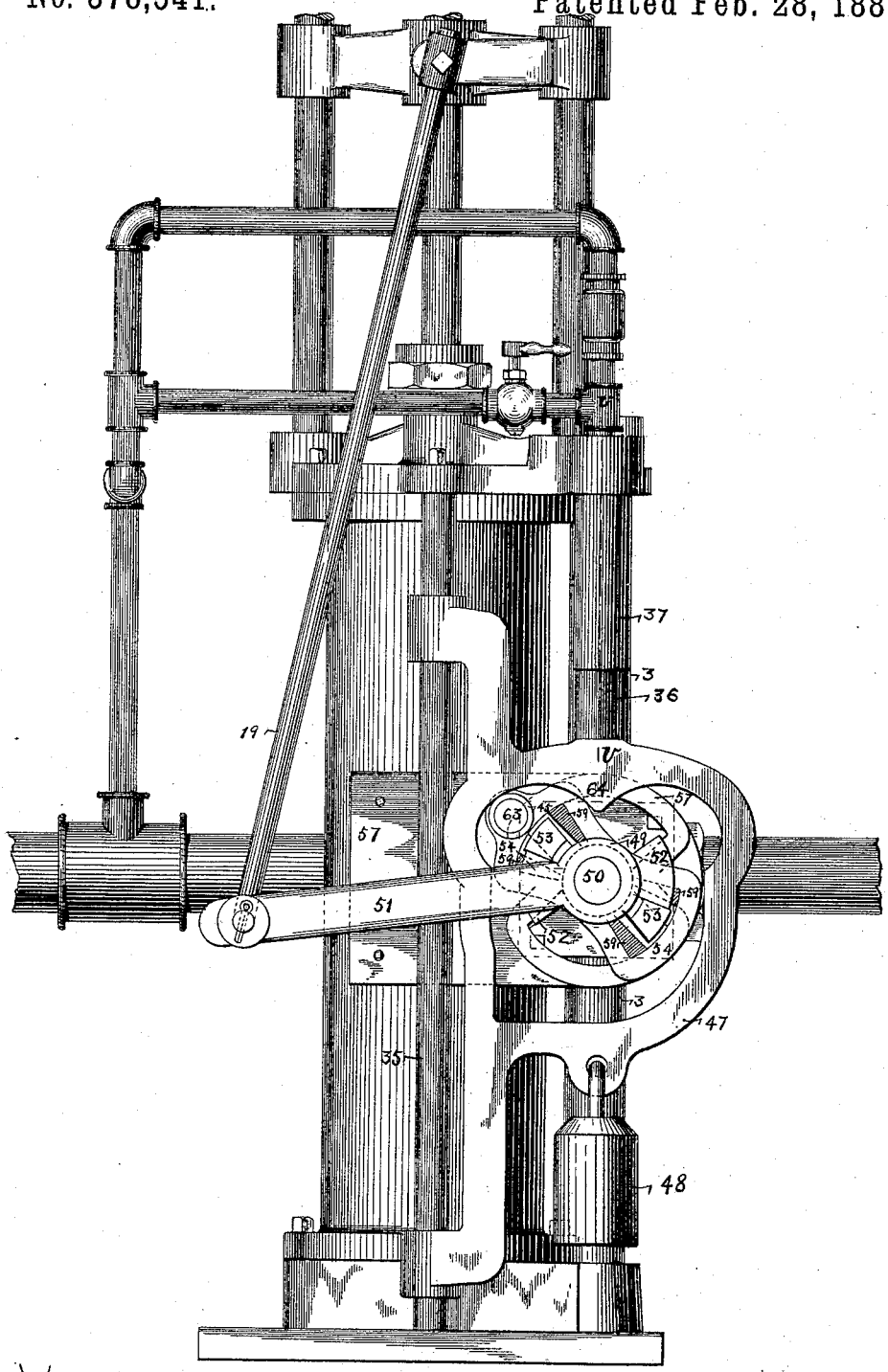
Figure 8:
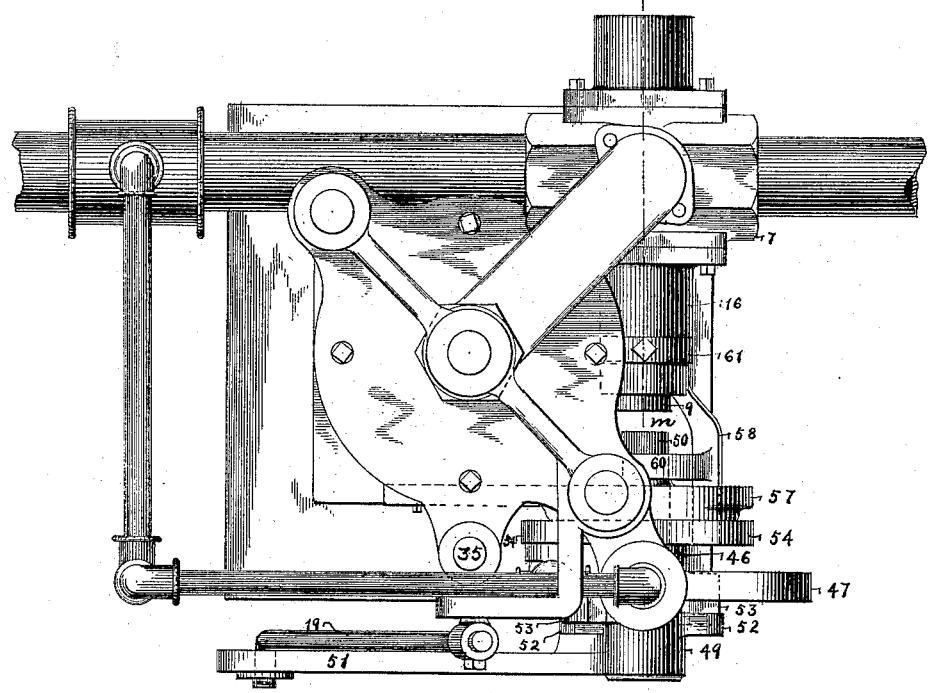
Figure 9:
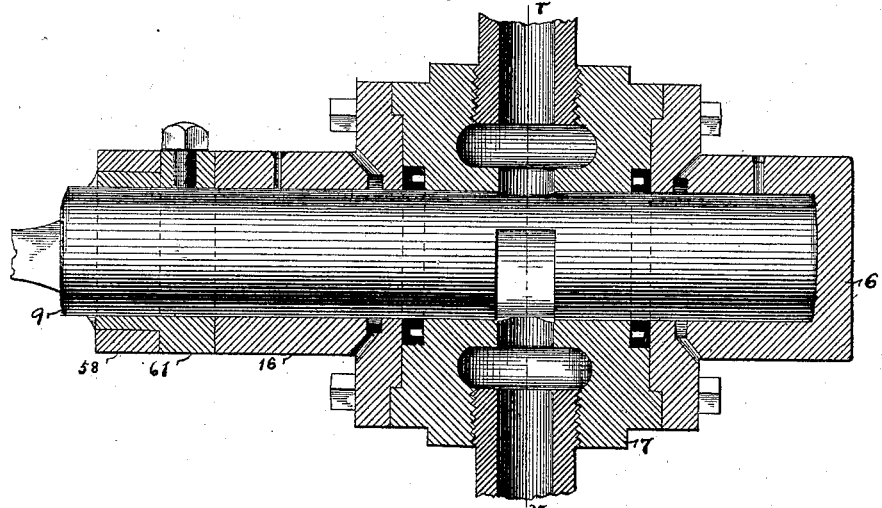
Figure 10:
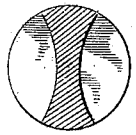

Figure 1 is a side elevation of a machine which is intended for an organ-blowing motor, to be driven by water from an ordinary service-pipe; and Fig. 2 is a plan of the same. Fig. 3 is an elevation, partially in central vertical section at the line *x x* of Fig. 2, of parts of a valve and its casing such as I have found to be useful in such a motor. Fig. 4 is an elevation, partly in section, looking toward the right at the line *n n* of Fig. 3, of the valve-stem and valve which are shown in that view, together with a portion of the valve-casing. Fig. 5 is a partial elevation, upon a larger scale, of the other figures, of the valve stem and certain of its actuating parts, which are shown as seen when looking toward the left at the machine that is shown in Fig. 1. Fig. 6 is an elevation, partly in section at the line *y y* in Fig. 1, of the auxiliary fluid-cylinder and its piston, which I use in connection with a movable cam to control the motion of the valve in certain of its positions in such motors and for other purposes in different kinds of motors. Fig. 7 is an elevation of a modified form of such an organ-blowing motor. Fig. 8 is a plan of the same. Fig. 9 is an elevation, partly in section at the line *m m* of Fig. 8, of the valve and its casing in a modified form; and Fig. 10 is an elevation, partly in section at the line *v v* of Fig. 9, of the valve-rod and valve used therewith. Fig. 11 is a partial elevation, upon a larger scale, of the valve-stem and certain of its actuating parts, which are shown as they would appear when looking toward the left at the machine that is shown in Fig. 7. Fig. 12 is a partial elevation of the valve-stem and its casing, showing a collar attached thereto, which is provided with a square projection that engages with a loose connection (shown in dotted lines) which actuates the valve-stem from a tumbling sleeve, hereinafter described; and Fig. 13 is an end elevation of the parts shown in Fig. 12, the loose connection in this case being partially shown in full lines. Fig. 14 is an elevation, partly in central section, taken at the line *v v* of Fig. 7, of a slightly-modified form of the auxiliary fluid-cylinder and its piston.

Similar reference-numbers refer to similar parts in all of the views.

In the form of motor that is shown in Figs. 1 to 6, inclusive, a main cylinder, 1, is used, and a reciprocating main piston of any ordinary construction, to which is attached the piston-rod 2, works therein in the usual way. Fluid is conducted to and from each end of the cylinder through pipes 3, which are connected to passages which are formed in the heads 4 of the cylinder, the metal surrounding the passage into the upper end of the cylinder being shown in Fig. 2 at 5. The fluid is caused to flow in the desired direction through the pipes 3 by means of a valve which is supported within the valve-casing 7, that is placed between and connected to the pipes 3, and also between and connected to the pipes 14 and 11. The cylinder and the piston, as well as the water-passages which lead from the valve to the cylinder ends, may be of any ordinary construction, since these parts may be equivalently formed in any one of many different ways which are now well known as suitable for such parts. The valve which I have chosen for illustration as the fluid-distributer in this motor is made by cutting grooves 8 in the sides of a rocking cylindrical stem, 9. This leaves the valve-faces 10, which, working in connection with the four ports in the valve-casing 7, make an ordinary four-way cock. Two of these ports communicate with the pipes 3, while the two at right angles thereto communicate with the exhaust-pipe 11 and the supply-pipe 14, as indicated by the arrow-heads in Fig. 4.

When water is used to drive the piston of the motor, I prefer to make the face 10 of the valve about equal to the width of a port, and the width of the bridge in the casing 7 between two ports about equal to the width of a port, all as shown in Fig. 4. When this is the case, the valve will nearly always be in such a position that the supply-pipe 14 is in communication with one end of the cylinder 1, while the exhaust-pipe 11 is in communication with the other end thereof, since, as will hereinafter be shown, the valve will always move very quickly past the position where it is shown in Fig. 4, where every port is closed to all of the others.

I prefer to support the valve-stem in the casing 7, as shown in Fig. 3, the water being prevented from flowing along the valve-stem by ordinary cupped-leather packing-rings, 15, or other equivalent kind of packing. The end of the valve-stem is preferably covered by the cap 6, while the body thereof is supported by the sleeve 16. I prefer to form both in the cap 6 and the sleeve 16 the grooves 17, making a passage to the air both at the top and bottom thereof, in order that the few drops of water which may chance to leak by the packing-rings 15 may freely escape from the valve-stem. I am thus able to easily lubricate with oil the parts of the valve-stem which are not properly in contact with the water through holes 18 in the cap 6 and sleeve 16, a proceeding which would not be really practicable unless the said leakage of water was allowed to escape, as described.

I have chosen for illustration the form of valve that is shown in the drawings because I have found it to be well suited for a water-distributer for such a motor; but I do not desire to limit myself in the use of my invention to that especial form, since a slide-valve or any other usual form of valve may be used for this purpose.

The main piston is caused to travel in either direction, as desired, by rocking the valve-stem 9 and bringing the supply-pipe 14, that is connected to a water-supply, into communication with the proper end of the cylinder. Water will then flow into that end of the cylinder and drive the main piston before it, the water that is in the other end of the cylinder escaping through the exhaust-pipe 11. By rocking the valve-stem 9 until the other end of the cylinder is in communication with the supply-pipe 14 the main piston will be driven in the opposite direction, the water escaping through the exhaust-pipe 11, which will then communicate with the first end of the cylinder. This rocking motion of the valve-stem might be readily provided for by attaching an arm to the valve-stem 9 and connecting that arm directly by the rod 19 to the cross-head 20, that is attached to the piston-rod 2, if it were not for the fact that if this were done there would be an instant when the valve would be in the position that is shown in Fig. 4, and the piston would then be locked fast in the cylinder with no means of releasing it without disconnecting the rod 19 and moving the valve independently of the piston. It is to overcome this difficulty that I have applied certain new mechanism to the motor that is illustrated in Figs. 1 to 6, inclusive, and this new mechanism is shown in Figs. 1 and 5.

To the valve-stem 9 is rigidly fastened the arm or tumbler 21, into which is preferably fastened the stud 22. This stud is preferably provided with a roller, 23, which is shorter than the said stud and is held in place thereon by the small pin 24. A collar, 25, attached to the valve-stem 9 by means of the set-screw 26, or other equivalent means, serves to longitudinally confine the primary valve-rocker or tumbler-driver 27, which works loosely upon the valve-stem 9, and to which is shown attached the eccentric 28. This eccentric 28 may be made with means for adjusting its throw, as shown in the drawings, or without such means, as desired. If no adjustability of throw is desired in this eccentric, it may be cast in a single piece with the primary rocker or tumbler-driver 27 when desired. The purpose of the eccentric 28 is to vibrate the cam 33 upon the pivot 32 at its base, and any equivalent means may be substituted therefor for this purpose when it is desirable to do so, among which may be mentioned a crank fastened to the valve-stem 9 and a connecting-rod leading from said crank to said cam. The primary rocker 27 is shown as having a hollow arm, 29, into which the arm 30 is fitted and secured by a set-screw. This arm 30 may be clamped in any desired position in the arm 29 by the said set-screw, thus bringing the eye in its end to which the arm 19 is attached at any desirable distance from the axis of the valve stem 9. Any other usual means of adjusting the length of such a rocking arm may be equivalently adopted therefor. The rod 19 connects the arm 30 to the cross-head 20, that is attached to the piston-rod 2, and causes the said arm and the primary rocker 27 to move synchronously with the piston.

The primary rocker or tumbler-driver 27 is provided with two lugs, 31, which at the proper times engage with the stud 22, and thereby rock the valve-stem 9. These lugs are shown as placed so far apart that they do not come in contact with the stud 22, except near the ends of the stroke of the piston. Upon the roller 23 rests the bodily-reciprocating cam 33, which is shown as rocking at its base upon the pivot 32, that is secured to the cam support or slide 34. This cam-slide moves with a reciprocating motion and is guided by one or more guide-rods, 35, or otherwise constrained to move parallel to the piston in this motor and in any other suitable direction in other classes of motors. The cam 33 is in this case preferably made so that when in its middle position the point 64 of the cam will be directly over the pivot at its base. Upon the cam support or slide 34 rests the end of the plunger 36, which works in the cylinder 37. The plunger 36 is shown in detail in Fig. 6, and is represented as packed by a cupped-leather packing secured to its top by a screw and washer. The cylinder 37 and the plunder 36 may be made in any ordinary way and packed in any convenient manner and supported by the cylinder-head 4, as shown in Fig. 1, or in any other suitable way. A slightly modified form of the cylinder 37, with its plunger, is shown in Fig. 14. The fluid in the supply-pipe 14, which drives the piston of the motor, also acts upon the end of the plunger 36, being led thereto through the pipes 38 and 39. The cock 40, which is sometimes used, serves to regulate with great exactness the quantity of fluid which in a given time can flow to the cylinder 37 from the supply-pipe 14. Instead of the cock 40, any other suitable form of quantity-controller for regulating the flow of the fluid in the pipe 39 may be equivalently substituted when it is desirable to do so.

The plunger 36 moves with a reciprocating motion in the cylinder 37, being always exposed to the pressure of the fluid in the supply-conduit 38, thus forming a motor, which is in this case a fluid-actuated cam-presser; but it is often the case that it is desirable to provide a very free passage for the escape of the fluid from the working parts of the motor when said plunger is forced into said cylinder by any means—as, for instance, by the motion of the bodily-reciprocating cam 33 toward said plunger. This free passage is provided, when desired, through the secondary conduit 42, or its equivalent, which leads from the cylinder 37 and which is provided with an automatically-acting valve, 41, opening to allow fluid to pass through it and away from said cylinder. The secondary conduit 42 is, when used, preferably led from the fluid-actuated cam-presser around the quantity-controller 40 to the supply-conduit 38, in which case the pressure of the fluid in said supply-conduit aids in holding the valve 41 closed, and no fluid is wasted by being discharged from said secondary conduit.

The method of operation of this form of motor may now be clearly and easily understood, and is as follows: The piston moving, for example, in the upward direction comes toward the end of its stroke, when one of the lugs 31 of the primary rocker 27 comes in contact with the stud 22, and thereby begins to rock the valve-stem 9 in such a way as to partially close the valve, thus decreasing the speed of the piston. At the same time the bodily-reciprocating cam 33 and its support are being raised by the stud 22 and its roller and the fluid in the cylinder 37 forced back into the supply-pipe, while the cam 33 is also being rocked upon the pivot 32 at its base by the eccentric 28 in such a way that the point 64 of the cam 33 moves toward the roller 23 as if to meet it. The arm 21 is so fixed to the valve-stem that when the arm is vertical the valve will be in the position that is shown in Fig. 4; but on account of the rocking of the cam upon the pivot at its base the point 64 of the cam will not only have met but passed the highest point of the roller 23 before the arm 21 becomes vertical and before the valve has entirely closed the port leading to the bottom of the cylinder. Such being the case, the cam 47, acted upon by the cam-presser, which in this case consists of the weight of itself and of the cam-slide, together with the pressure exerted upon the end of the plunger 36 by the driving-fluid, will act upon the roller 23 like a wedge and cause the said roller to move rapidly, taking the stud 22 and the arm 21 with it away from the lug 31, which had until this time been the cause of their motion. This will cause the valve to move quickly past the position shown in Fig. 4, and cause the upper end of the cylinder to come into communication with the supply-pipe and the lower end thereof with the exhaust-pipe 11, the motion of the valve being arrested at the proper point in consequence of the lug 43 upon the arm 21 coming into contact with a cushion of wood or other suitable material that is supported in a slot in the plate 44, in which the said lug plays, or by the roller 23 running into a pocket formed in the cam 33 for the purpose, or in some other equivalent manner. The main piston will then descend and the same operations be performed at the lower end of the stroke, the only differences being that the primary rocker and the valve-stem move in the contrary direction at that end of the stroke.

It will be readily perceived that in a motor of this construction, on account of the peculiar motion of the valve, the piston comes gently and gradually to rest at each end of its stroke, although the direction of its motion is promptly reversed when it reaches either end of the cylinder; also, that the speed with which the valve moves may be regulated with great ease by properly adjusting the cock 40; also, that it is impossible to stop this motor in a situation where it will not at once start in motion when a fluid under sufficient pressure is supplied to it when the motor is in good order. If the speed of the motor is regulated by the pressure of the fluid in the supply-pipe 14 being varied automatically or otherwise, as is usually the case with this class of motors, the valve 40, once adjusted for one speed, will also be properly adjusted for all usual speeds, the velocity of the flow of the fluid through the valve 40 and the quickness of the motion of the valve-stem 9 changing simultaneously with the speed of the main piston of the motor.

It will be readily perceived, when the method of operation of the cam 33 and the fluid-actuated cam-presser formed by the fluid pressing upon the end of the plunger 36 is understood, that some other forms of mechanism may be equivalently utilized for giving the desirable motion to the valve-stem 9 besides that illustrated in Figs. 1 to 6, inclusive, one of which forms is that which is illustrated in Figs. 7 to 14, inclusive. Others of these equivalent forms will readily suggest themselves to those skilled in the art of making motors.

The motor shown in Figs. 7 to 14, inclusive, is of the same general construction as that already described; but a slightly-different mechanism is illustrated for bringing the roller 45, that is upon a stud, 63, that is supported upon an arm that is connected to the tumbling sleeve 46, under the point 64 of the sliding cam 47 at the moment just before the valve-stem 9 is in such a position that all the ports in the casing 7 are closed. This mechanism performs the same functions as the eccentric 28 and the rocking cam 33, with the cam-slide 34, hereinbefore described. The bodily-reciprocating cam 47 is in Fig. 7 shown as constrained by the guide-rod 35 to move in a straight line parallel to the axis of the main cylinder, and a weight, 48, attached to the said cam, is shown as aiding the auxiliary plunger 36 in forcing the said cam in a downward direction. It is evident that in both forms of motor illustrated this weight may be made so large that the fluid-actuated cam-presser formed by the auxiliary cylinder 37 and its plunger 36 may be entirely dispensed with, and that a sufficiently powerful spring of other construction may be sometimes used to replace the weight 48, either as an aid to the fluid-actuated cam-presser above the cam or in substitution therefor. The primary rocker 49 is in this form of motor supported upon the small shaft 50, and is provided with the arm 51, which is joined with the cross-head of the motor by the rod 19 and with the lugs 52. These lugs 52 engage with the lugs 53 upon the tumbling sleeve 46. The sleeve 46 is provided with the loose-connection driver 54 at one end, and this driver is supplied with the stud 63, and preferably with the roller 45 upon the said stud. The shaft 50 is supported by the plate 57, which is provided with slots through which pass the ends 62 of the fork upon the loose connection 58. The ends 62 of the fork upon the said loose connection engage with slots in the loose-connection driver 54, which slots are preferably faced upon each side with cushions 59, of wood, leather, or other suitable material, in order to prevent jarring of the parts. In Fig. 7 the ends 62 of the fork of the loose connection are hidden by the lugs 52 and 53, which are directly before them. The loose connection 58 is preferably provided with a collar, 60, which bears upon the end of the shaft 50, and with a square end which engages with the square-ended collar 61. The valve-stem 9 is like that shown in Fig. 3, except that it is shorter and it is rocked by the loose connection 58 through the collar 61, which is attached to the said stem. The action of this mechanism may now be readily understood, and is as follows:

The main piston, moving upward, actuates, by means of the rod 19, the arm 51 of the primary rocker 49. When the main piston has moved a considerable portion of its stroke, the lugs 52 come in contact with the lugs 53, as shown in Fig. 7, and thus begin to rock the tumbling sleeve 46. This sleeve then begins to raise the cam 47 by means of the roller 45 upon the stud 63. When the tumbling sleeve 46 has moved a short distance, the sides of the slots in the loose-connection driver 54 come into contact with the ends 62 of the fork of the loose connection, and thereby begin to rock the valve-stem 9. In this case, since the ends 62 of the fork of the loose connection occupy but a small portion of the slots in the loose-connection driver 54, the pin 63 upon the said driver and the roller thereon will arrive at the point 64 of the cam 47 before the valve-stem 9 has been rocked far enough to entirely close the ports in the valve-case 7. When the said roller has just passed the point 64 of the cam 47, the plunger 36 and the weight 48 will, as in the motor shown in Fig. 1, force the said cam downward, and thereby cause the roller and the pin 63, which supports it, to quickly move forward, carrying with them the loose-connection driver, the loose connection, and the valve-stem 9, this motion continuing until the fork of the loose connection strikes the sides of the slots in the plate 57, through which it passes. When this occurs, the valve in the casing will be in such a position that the ports leading to the supply-pipe and to the upper end of the main cylinder will be fully open and in communication with each other, as will also the ports leading to the exhaust-pipe and the lower end of the said cylinder. The main piston then begins to descend, and when near the end of its stroke the lugs 52 and 53 engage with each other upon their faces which are opposite to those where they came in contact when the main piston was at the upper end of the cylinder, and soon the roller 45 begins to raise the cam 47, and the loose-connection driver begins to rock the valve-stem 9 in the opposite direction to that in which it was rocked when the main piston was at the upper end of the cylinder. The roller 45 passing the point 64 of the cam 47 before the ports in the casing 7 are entirely closed, the action of the said cam and its connected mechanism quickly closes the said ports and brings the valve in the position necessary to drive the main piston upward again, the fork of the loose connection being arrested by coming in contact with the sides of the slots in the plate 57, as when the piston was at the upper end of the main cylinder, the only difference being that the ends 62 of the fork come in contact with the opposite sides of the said slots.

It will be seen that in both forms of motor illustrated the distributing-valve upon the valve-stem 9 is nearly closed at each end of the stroke of the main piston by mechanism which is directly connected to the said piston, and which thus moves synchronously therewith, and that when the valve is nearly closed other mechanism quickly completes the closing of the said valve and then opens it in a different direction, utilizing energy therefor which had been received from the main piston of the motor in an earlier part of its stroke. The mechanism which performs the second part of the operation of moving the said valve is seen to consist of a cam having a pointed shape and working in connection with what may be termed a "tumbler." This tumbler is first forced under the point of the said cam by a tumbler-driver actuated by the main piston, raising the said cam against the resistance of a cam-presser until the working-point of the tumbler passes the point of the cam. When this has occurred, the cam, in consequence of its being acted upon by the said cam-presser, immediately begins to drive the tumbler forward in its course. The tumbler is shown as moving in a curved path, caused by its rocking upon a central pivot; but it is evident that it may sometimes be constrained to move in a different path—such, for instance, as a straight line. It is also evident that the energy stored up by the action of the tumbler upon the cam may be utilized by connecting the said tumbler to the valve in other ways than that illustrated, or by connecting the said tumbler to other parts of the mechanism of the motor when it is desirable to do so. This cam and tumbler may easily be arranged to assist in the manipulation of the valve of what is known as a "single-acting" cylinder, or one where but one end of the cylinder is used to be filled with the working-fluid. The shape of the cam, as shown in Figs. 1 and 7, is suitable for use in the conditions found in the motor illustrated; but for other kinds of machines this form may be suitably modified. No way of utilizing the power developed by the action of this motor is shown in the drawings; but any suitable mechanism for this purpose may be attached to the piston-rod 2 or to the cross-head connected thereto.

It is evident that it may be sometimes desirable to entirely shift the valve which controls the motion of the driving-fluid in a machine of the class herein described by mechanism actuated by the herein-described tumbler, and I desire to be understood to claim such a construction as equivalent to that where the valve is partially shifted by mechanism actuated by the main piston and partially by mechanism actuated by the said tumbler.

What I claim as new, and desire to secure by Letters Patent, is—

1. The fluid-driven machine consisting of a main cylinder and a piston reciprocating therein, a valve controlling the motion of said piston, a rocking tumbler-driver actuated by said piston, a tumbler primarily actuated by said tumbler-driver and actuating said valve, a pointed bodily-reciprocating cam pressing on said tumbler, a cam-support to which said cam is pivoted, an eccentric actuated by said piston and rocking said cam on its supporting-pivot, a fluid-actuated cam-presser provided with a supply-conduit leading thereto, a quantity-controller in said supply-conduit, a secondary conduit connected with said supply-conduit between said cam-presser and said quantity-controller, and an automatically-working valve in said secondary conduit opening to allow the driving-fluid to leave said cam-presser and kept normally closed by fluid-pressure, substantially as described, and for the purposes specified.

2. In a fluid-driven machine, a main cylinder and a piston reciprocating therein and a valve controlling the motion of said piston, combined with a pointed bodily-reciprocating cam, a tumbler working in connection with said cam, means connected with said piston for forcing said tumbler under and past the point of said cam, and a cam-presser forcing said cam against said tumbler, and thereby forcing said tumbler along in its course when it has been forced past the point of said cam, substantially as described, and for the purposes specified.

3. The combination, in a fluid-driven machine, of a main cylinder and a piston reciprocating therein, with a valve controlling the motion of said piston, a tumbler-driver actuated by said piston, a tumbler primarily actuated by said driver and actuating said valve, a pointed bodily-reciprocating cam, a cam-presser forcing said cam against said tumbler, and an eccentric or its equivalent actuated by said piston for bringing the point of said cam and the said tumbler together before said piston has reached the end of its stroke, substantially as described, and for the purposes specified.

4. The combination, in a fluid-driven machine, of a main cylinder and a piston reciprocating therein, with a valve controlling the motion of said piston, a tumbler-driver actuated by said piston, a tumbler primarily actuated by said driver and actuating said valve, a pointed bodily-reciprocating cam, a fluid-actuated cam-presser forcing said cam against said tumbler to give said tumbler a secondary motion independent of the motion of said tumbler-driver, and a means for bringing said tumbler and the point of said cam together before said piston has reached the end of its stroke, substantially as described, and for the purposes specified.

5. The combination, in a fluid-driven machine, of a main cylinder and a piston reciprocating therein, with a valve controlling the motion of said piston, a tumbler-driver actuated by said piston, a tumbler primarily actuated by said driver and actuating said valve, a pointed bodily-reciprocating cam, a fluid-actuated cam-presser forcing said cam against said tumbler to give said tumbler a secondary motion independent of said tumbler-driver, a supply-conduit leading to said fluid-actuated cam-presser, a secondary conduit leading from said fluid-actuated cam-presser, an automatically-working valve in said secondary conduit opening outwardly from said fluid-actuated cam-presser, and a means for bringing said tumbler and the point of said cam together before said piston has reached the end of its stroke, substantially as described, and for the purposes specified.

6. The combination, in a fluid-driven machine, of a main cylinder and a piston reciprocating therein, with a valve controlling the motion of said piston, a tumbler-driver actuated by said piston, a tumbler primarily actuated by said tumbler-driver and actuating said valve, a bodily-reciprocating pointed cam that is pressed against said tumbler, a cam-support to which said cam is pivoted, and an eccentric actuated by said piston and rocking said cam upon its supporting-pivot to bring the point of said cam and said tumbler together before the end of the stroke of said piston, substantially as described, and for the purposes specified.

7. The combination, in a fluid-driven machine, of a main cylinder and a piston reciprocating therein, with a valve controlling the motion of said piston, a rocking tumbler-driver actuated by said piston, a tumbler primarily actuated by said driver and actuating said valve, a pointed bodily-reciprocating cam pressing on said tumbler, a cam-support to which said cam is pivoted, an eccentric actuated by said piston and rocking said cam on its supporting-pivot, a fluid-actuated cam-presser provided with a fluid-supply conduit leading thereto, a secondary conduit leading from said fluid-actuated cam-presser, and an automatically-working valve in said secondary conduit opening to allow fluid to leave said fluid-actuated cam-presser, substantially as described, and for the purposes specified.

WM. P. CANNING.

Witnesses:
  P. N. KENWAY,
  CHARLES H. FISHER.